US005182571A

United States Patent [19]

Creagh et al.

[11] Patent Number: 5,182,571

[45] Date of Patent: Jan. 26, 1993

[54] HOT MELT INK JET TRANSPARENCY

[75] Inventors: Linda T. Creagh, West Lebanon, N.H.; Charles W. Spehrley, Jr., Hartford, Vt.

[73] Assignee: Spectra, Inc., Hanover, N.H.

[21] Appl. No.: 758,391

[22] Filed: Sep. 3, 1991

Related U.S. Application Data

[63] Continuation of Ser. No. 485,289, Feb. 26, 1990.

[51] Int. Cl.[5] ........................ G01D 9/00; G01D 15/18

[52] U.S. Cl. ........................ 346/1.1; 346/140 R

[58] Field of Search ........................ 346/140 R, 75, 1.1

[56] References Cited

U.S. PATENT DOCUMENTS

| | | | |
|---|---|---|---|
| 4,528,242 | 7/1985 | Burwasser | 428/413 |
| 4,547,405 | 10/1985 | Bedell et al. | 427/256 |
| 4,555,437 | 11/1985 | Tanck | 428/212 |
| 4,575,465 | 3/1986 | Viola | 427/261 |
| 4,578,285 | 3/1986 | Viola | 427/209 |
| 4,592,954 | 6/1986 | Malhotra | 428/335 |
| 4,631,557 | 12/1986 | Cooke et al. | 346/140 R |
| 4,741,930 | 5/1988 | Howard et al. | 427/265 |
| 4,746,935 | 5/1988 | Allen | 346/140 R |
| 4,781,985 | 11/1988 | Desjarlais | 428/421 |
| 4,873,134 | 10/1989 | Fulton et al. | 428/156 |
| 4,877,676 | 10/1989 | Creagh et al. | 428/204 |
| 4,889,761 | 12/1989 | Titterington et al. | 428/195 |
| 4,951,067 | 8/1990 | Spehrley, Jr. | 346/140 R |

FOREIGN PATENT DOCUMENTS

| | | | |
|---|---|---|---|
| 61-25854 | 2/1986 | Japan | 346/140 R |

OTHER PUBLICATIONS

Webster's Ninth New Collegiate Dictionary, Copyright 1990, p. 623.

*Primary Examiner*—Benjamin R. Fuller
*Assistant Examiner*—Eric Frahm
*Attorney, Agent, or Firm*—Brumbaugh, Graves, Donohue & Raymond

[57] ABSTRACT

In the particular embodiments of the invention described in the specification, a transparency includes a transparent substrate made of a polyester material, a colored ink pattern disposed on one surface of the transparent substrate in the form of three-dimensional ink spots having curved surfaces, and spots of a colorless ink made of a material which has an index of refraction approximately the same as that of the colored ink spots deposited in overlapping relation to colored ink spots as to reduce the dispersion of light by those ink spots. In one embodiment, the colorless ink spots are located in regions having no colored ink spots and in another embodiment the colorless ink spreads to a greater extent than the colored ink.

23 Claims, 2 Drawing Sheets

HOT MELT INK JET TRANSPARENCY

This application is a continuation of application Ser. No. 07/485,289, filed on Feb. 26, 1990.

BACKGROUND OF THE INVENTION

This invention relates to transparencies made with ink jet printers using hot melt ink and to methods for making such transparencies.

Hot melt inks are used in certain ink jet printers. The characteristic of these inks is that they are solid at room temperature, liquified by heating for jetting, and resolidified by freezing on the marked substrate.

Transparency substrates are made of transparent sheet material, such as a polyester material, which is not receptive to liquid materials such as most solvent-based inks. When solvent-based ink jet inks are used to make transparencies, the substrate is coated with a layer receptive to the ink and the ink is absorbed into the coating. For example, U.S. Pat. Nos. 4,528,242 to Burwasser, 4,547,405 to Bedell et al., 4,555,437 to Panck, 4,575,465 and 4,578,285 to Viola, and 4,592,954 to Malhotra disclose special coatings which are capable of absorbing inks for transparent base material such as Mylar. Hot melt inks, however, do not penetrate into the substrate or into a coating on the substrate but adhere to the surface and retain a three-dimensional form. In this way they are distinct from inks which are absorbed or dry into a flat spot through evaporation or absorption.

When projected from a transparency, the deposited three-dimensional ink spots tend to scatter transmitted light in the manner of a dioptric lenticule. The small lenticules formed by the three-dimensional ink spots refract light which passes through them away from the path to the projection lens so that they cast gray shadows in projection irrespective of the color of the ink which forms the lenticule.

Attempts have been made to overcome this problem by flattening the three-dimensional ink spots on the transparent substrate, but such flattening affects only the uppermost portions of the spot, leaving the peripheral portions of the spots curved so as to refract most of the light passing through the ink spots away from the path to the projection lens. Consequently, although flattening of three-dimensional ink spots in a transparency may produce a slight improvement, the images made in this manner are still unsatisfactory.

SUMMARY OF THE INVENTION

Accordingly, it is an object of the present invention to provide a new and improved form of ink jet transparency in which the above-mentioned disadvantages are overcome.

Another object of the invention is to provide a new and improved method and apparatus for preparing ink jet transparencies which produces transparencies having improved characteristics.

These and other objects of the invention are attained by providing a transparent substrate, printing a hot melt ink jet pattern on the surface of the substrate which includes solid three-dimensional spots of colored ink having a curved surface, and printing a further ink jet pattern on the surface of the substrate with colorless ink to produce three-dimensional solid spots of colorless ink. As used herein, the term "colorless ink" means a transparent ink vehicle containing no coloring constituent. Preferably, the colorless ink is made from the same material as the colored ink, but omits the dye or pigment used in the colored ink, thereby providing substantially the same physical properties and index of refraction as the colored ink.

In a preferred embodiment, the colorless ink spots are applied to all of the regions of the substrate where there are no colored ink spots and the colorless ink spots at least partially overlap the colored ink spots to reduce dispersion of light by the colored ink spots.

The resulting transparency according to the invention comprises a transparent substrate, a pattern of three-dimensional colored ink spots having a curved surface deposited on the surface of the substrate, and a colorless overprinting on the substrate including colorless ink spots on the transparent substrate.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

In conventional transparency projectors, the transparency-illuminating optics are usually arranged with a reflector and a collecting lens so that light is transmitted through the transparency in approximately parallel rays, producing an image of the light source in the plane of the projection lens. In this way, except for light which has been scattered in other directions during its passage through the transparency and the illuminating system, substantially all of the illuminating light is collected by the projection lens so as to be useful in forming a projected image. If a substantial proportion of the light passing through each ink spot in the transparency pattern is scattered while light is transmitted through other portions of the transparency at full strength, the image projected by the projection lens will be deficient in contrast and color saturation, providing a generally gray, washed-out appearance.

Figure 1:
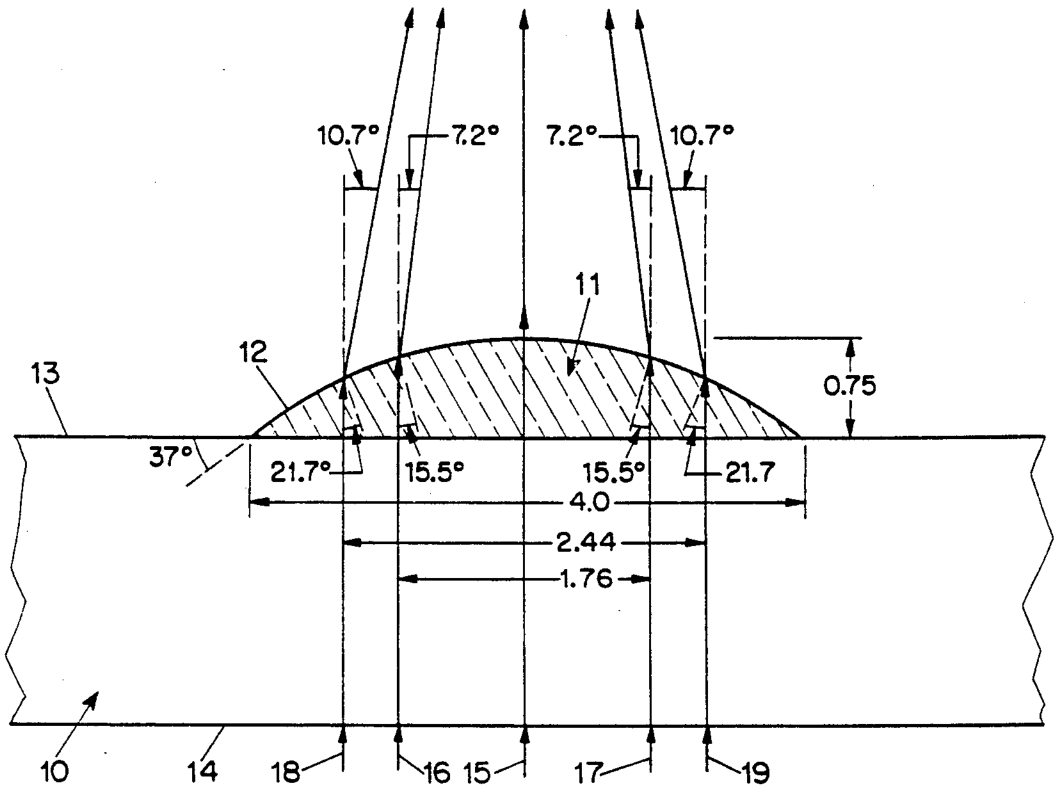
FIG. 1 is a schematic fragmentary sectional view illustrating the transmission of light through a transparency having a three-dimensional colored ink spot on one surface.

When an ink image is formed on a surface which cannot absorb the ink, such as when hot melt ink is used to make an image on a polyester sheet material, the ink solidifies in the form of three-dimensional spots which have a curved surface similar to the surface of a sphere. This is illustrated in FIG. 1, in which a transparent substrate 10 has a solidified ink spot in the shape of a segment of a sphere. In the illustrated example, the spot 11 has a diameter of about 4 mils, and a maximum thickness of about 0.75 mil, and the radius of its upper surface 12 is about 3.3 mils. Consequently, the surface 12 intersects the upper surface 13 of the substrate 10 at the periphery of the spot 11 at a relatively large angle, such as about 37 degrees.

In a projection system of the type mentioned above, the transparency is illuminated from the opposite side 14 by substantially parallel rays of light 15–19, which, in the example shown in FIG. 1, are incident in a direction approximately perpendicular to the surfaces 13 and 14 of the sheet 10. Essentially perpendicular incidence of the light rays will occur in the central region of the transparency, and at the periphery of the transparency the direction of illuminating light rays may deviate by a relatively small angle from the perpendicular, up to about 15 degrees, for example, depending upon the size of the transparency to be projected and the focal length of the projection lens. Consequently, while the quantitative effects described herein with reference to the illustration in FIG. 1 are applicable to ink spots in the central portion of a transparency being projected, the specific numerical values will differ somewhat for ink spots in the peripheral portions, but the same qualitative effects are applicable with respect to the ink spots in those portions of the transparency. In addition, it will be understood that the shape of each ink spot may deviate somewhat from the typical three-dimensional ink spot shape shown in FIG. 1, one common deviation being elongation of the spot in the direction of motion of the ink jet printhead from which the ink drop was ejected.

Conventional hot melt inks of the type used in ink jet printing have an index of refraction generally in the range of about 1.40 to 1.50. For purposes of illustration, the three-dimensional ink spot 11 illustrated in FIG. 1 is assumed to have an index of refraction of 1.45. With that index of refraction, rays entering the spot 11 at a distance of about 44% of the radius of the spot outwardly from the central ray 15, such as rays 16 and 17 shown in FIG. 1, will be incident on the surface 12 at an angle of about 15.5 degrees from the perpendicular, and, upon passage through the surface 12, will be deviated by refraction toward the central ray 15 by an angle of 7.2 degrees. The extent of such deviation from the direction of incidence of the rays increases as the distance from the central ray increases, and rays entering at a distance from the central ray 15 which is 61% of the radius of the ink spot, such as rays 18 and 19, will be incident on the surface 12 and angles of about 21.7 degrees from the perpendicular, resulting in a deviation of those rays by 10.7 degrees toward the central ray 15 upon passage through the surface 12.

If the projection lens used in the transparency projection system has an aperture of f/4, which is about the maximum aperture normally used in such systems, the projection lens will subtend an angle of about 14.4 degrees from each point in the image being projected. Thus, if any ray directed toward the projection lens is deviated by more than 7.2 degrees from the line extending between the center of the projection lens and the point being imaged, it will not be collected by the projection lens and will not be useful in forming a colored image. Consequently, with ink spots in a transparency of the type shown in FIG. 1, only those rays incident on the spot at distances from the center which are less than 44% of the radius of the spot will be transmitted to the projection lens. Such rays comprise only 19.4% of all of the rays incident on the ink spot, resulting in a loss of more than 80% of the incident light.

Even if the aperture of the projection lens is enlarged by 50%, the problem resulting from refraction of rays by ink spots cannot be avoided. In that case, the projection lens would subtend an angle of 21.4 degrees from each spot and would receive rays entering at distances from the central ray 15 up to 61% of the radius of the spot, such as rays 18 and 19 illustrated in FIG. 1. In that case, the lens would receive only about 37% of the rays incident on the ink spot. Thus, even with a substantially larger projection lens, more than 60% of the light incident on each spot is lost. On the other hand, light incident on the substrate 10 where there is no ink spot 11 is fully transmitted to the projection lens, so that the resulting projected ink pattern is relatively dark and substantially colorless in contrast to the relatively brighter background in which no three-dimensional ink spots refract the incident light.

Figure 2:
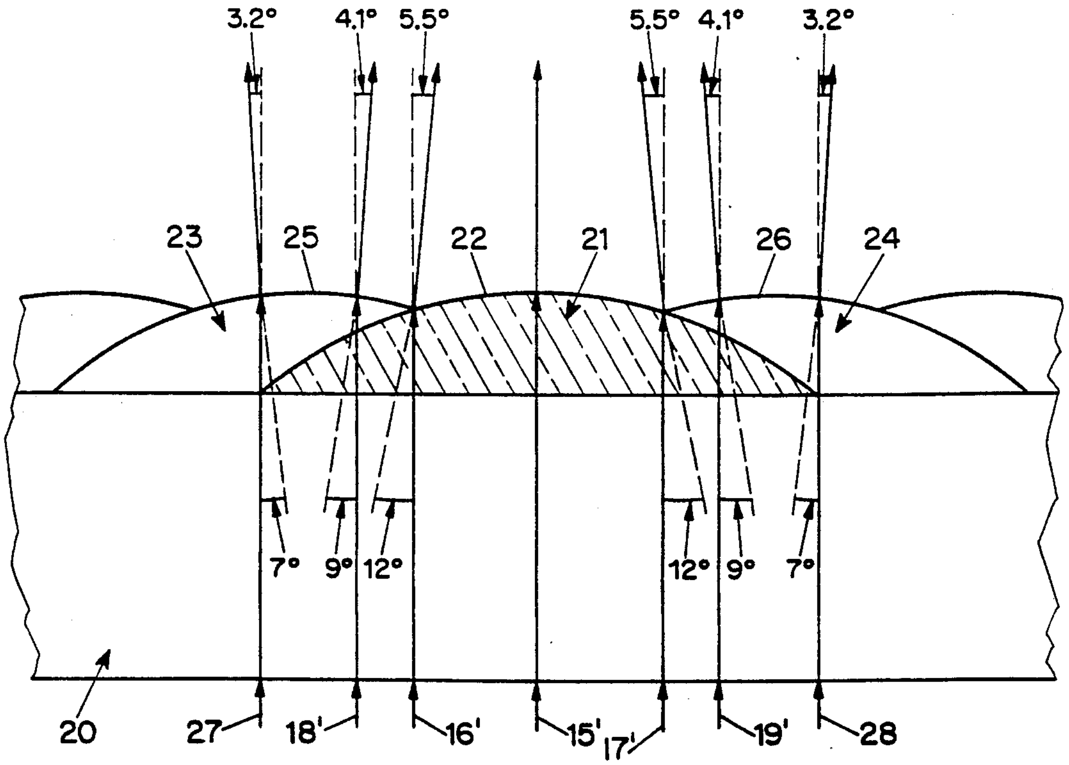
FIG. 2 is a schematic fragmentary sectional view of one embodiment of a transparency prepared in accordance with the present invention, illustrating the transmission of light rays through a three-dimensional colored ink spot and two overlapping colorless ink spots.

These problems, which have heretofore prohibited the preparation of good-quality transparencies using hot melt inks, have been overcome in accordance with the present invention by overprinting a transparency having three-dimensional colored ink spots of the type shown in FIG. 1 with a pattern of colorless ink spots. One embodiment of the invention is illustrated in FIG. 2. As shown in FIG. 2, the transparency comprises a transparent substrate 20 to which a colored three-dimensional ink spot 21 having a curved surface 22 has been applied. Thereafter, an array of spots of colorless ink having physical characteristics and index of refraction similar to those of the ink spot 21 is applied by jetting to regions of the substrate 20 having no colored ink spots. The colorless ink spots are applied so as to partially overlap the colored ink spots. For example, two colorless ink spots 23 and 24 partially overlap the ink spot 21 and provide surfaces 25 and 26 overlying the edges of the spot 21 which have a smaller angle of deviation from a plane parallel to the surface of the substrate than the corresponding portions of the surface 22. To provide an array of colorless ink spots having characteristics and index of refraction closely similar to those of the colored ink spots, the colorless ink is preferably prepared in the same way as the colored ink used to make the colored spot but without the dye or pigment which provides the color, but any colorless hot melt jettable material having an index of refraction within about 10%, and preferably within about 5%, of the index of refraction of the colored ink spot may be used.

Although only two colorless ink spots overlapping the colored ink spot 21 are illustrated in the two-dimensional sectional view of FIG. 2, it will be understood that the spot 21 is preferably substantially surrounded by overlapping colorless ink spots similar to the spots 23 and 24.

The substrate 20 of the transparency may be any conventional transparent substrate which is compatible with the materials in the ink spots 21, 23 and 24. Hot melt inks are usually made with natural or synthetic waxes. Polyester substrates, such as the sheet materials marketed as optical base "Mylar", 3M Scotch Brand No. 501 and Arkwright No. 723 are especially suitable. Preferably, the surfaces of the substrate are smooth rather than being roughened.

The effect of the colorless ink spots 23 and 24 on transmission of light through the ink spot 21 is illustrated by the paths of the light rays shown in FIG. 2. In this illustration the spot 21 has the same shape as the spot 11 in FIG. 1, and it is assumed that the colorless spots 23 and 24 have the same index of refraction as that of the ink spot 21. The rays 15'–19' in FIG. 2 correspond to the entering rays 15–19, respectively, in FIG.

1, but, as shown in FIG. 2, they pass through the interfaces between the ink spot 21 and the ink spots 23 and 24 without deviation because the index of refraction on both sides of the interface is the same.

In the example shown in FIG. 2, the surfaces 25 and 26 of the colorless spots 23 and 24 are shaped so that the rays 16′ and 17′ are incident on those surfaces at an angle of 12 degrees and the rays 18′ and 19′ are incident on those surfaces at an angle of 9 degrees. As a result, the emerging rays are deviated by angles of only about 5.5 and 4.1 degrees, respectively, as shown in FIG. 2. Consequently, those rays and all other rays passing through other similarly disposed colorless ink spots overlapping the spot 21 are well within the 7.2 degree half angle subtended by an f/4 projection lens.

Moreover, the rays 27 and 28, which pass through the periphery of the ink spot 21, are incident on the surfaces 25 and 26 of the colorless spots 23 and 24 at an angle of 7 degrees, resulting in a deviation of only about 3.2 degrees from the direct line between the spot and the center of the projection lens. As a result, with a pattern of overlapping colorless ink spots of the type illustrated in FIG. 2, substantially all of the light incident on an ink pattern containing ink spots such as the ink spot 21 will be transmitted to a projection lens having an f/4 aperture, producing a clear, bright, full-color image.

In regions of the transparency where the substrate is covered by colored ink drops which have overlapped in a similar manner or merged during printing of an image, the same result will be obtained. Consequently, overprinting of images with colorless ink drops is necessary only in the region surrounding a solid colored region of an image.

The colorless ink spots 23 and 24 may overlap the colored ink spot 21 to a greater or lesser extent than shown in FIG. 2 and still provide the above-described improvement to a greater or lesser degree. For example, if the spots 23 and 24 are moved closer to the center of the spot 21, the maximum deviation angle of 5.5° will be reduced somewhat and the deviation of the outermost rays 27 and 28 will be increased from 3.2° to a value less than 5.5°. On the other hand, if the spots 23 and 24 are moved away from the center of the spot 21, the maximum deviation angle of 5.5° will increase but may still be within the 7.2° half angle subtended by an f/4 projection lens. Preferably, in an overlapping spot arrangement of the type shown in FIG. 2, the colorless spots should overlap the outer portion of the colored ink spot by at least about one-third of the radius of the colored ink spot, which is usually achieved if the colorless ink drops are of similar volume and have the same spreading characteristics as the colored ink drops and are applied at the same spacing as the colored ink drops.

Figure 3:
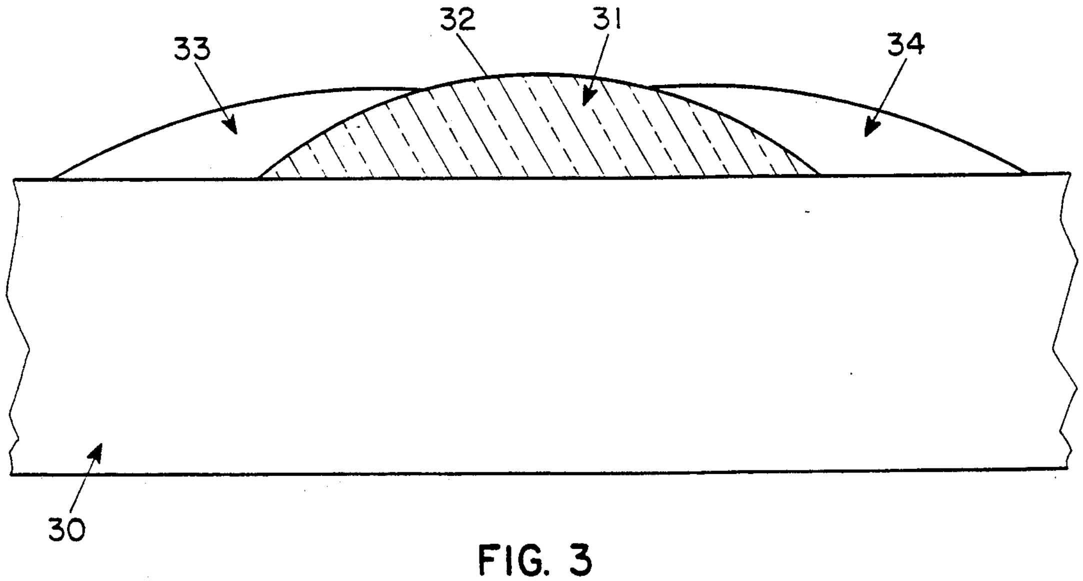
FIG. 3 is a schematic fragmentary sectional view of another embodiment of a transparency prepared in accordance with the invention, illustrating a three-dimensional colored spot and two overlapping colorless ink spots which have a different spreading characteristic.

In another embodiment, illustrated in FIG. 3, a colorless ink having greater spreading characteristics than that of the colored ink is used and spots of this colorless ink are applied only in the regions adjacent to the colored ink regions of the image. In this case, as in the first embodiment, the index of refraction of the colorless ink should be approximately the same as that of the colored ink.

As shown in FIG. 3, a transparent substrate 30 is printed with a colored ink spot 31 having a curved upper surface 32 with a radius of curvature similar to that of the drop 21 of FIG. 2, proving a contact angle of, for example 37° with the substrate. Thereafter, the spot 31 is surrounded by adjacent overlapping colorless ink drops having a greater spreading characteristic, only two of which 33 and 34, are shown in FIG. 3. The greater spreading characteristic of these colorless ink drops, which may be produced by decreasing the melting point or the viscosity of the ink so that it flows more quickly at the temperature of application of the ink, causes the surfaces of the drops to have a smaller contact angle with the substrate than the colored ink drop. The contact angle of the colorless drops with the substrate should be less than 25°. Preferably the contact angle of the colorless ink drops is in the range of about 3 degrees to about 20 degrees, and, more desirably, in the range of about 5 degrees to about 10 degrees.

Although not illustrated in detail in FIG. 3, it is apparent from the above discussion that the provision of such colorless spots having a small contact angle with the substrate will minimize unwanted refraction of light from the periphery of the colorless spots. The effect of reducing the contact angle of ink drops is described in detail in the Fulton et al. U.S. Pat. No. 4,873,134. With this arrangement, less colorless ink is required than for the arrangement described in connection with FIG. 2 and higher printing speeds may be achieved by utilizing conventional logic-seeking techniques and white space slewing in regions where there is no colored image. Moreover, because the colorless ink vehicle need not be compatible with dyes or pigments, additional formulation freedom is obtained, permitting the use of colorless inks which have not only a greater spreading ability but also increased clarity in comparison with colored inks.

The spots of colorless hot melt ink may be applied to the transparency by one or more additional jet orifices in the same ink jet head used to produce the colored spot pattern, on either the same or a subsequent scan of the head with respect to the transparency base. If the colorless ink spots are applied during the same scan of the ink jet head in which the colored ink spots are applied, the inks should be selected to prevent significant mixing or diffusion of ink colorants into the colorless ink during the solidification time in order to maintain good edge definition. Alternatively, the colorless ink spots may be added to a previously prepared transparency either by applying the spots in a uniform pattern, or by controlling the application of the colorless spots in accordance with colored image spot location information provided by an image processor.

Although the invention has been described herein with reference to specific embodiments, many modifications and variations of the invention will be obvious to those skilled in the art. For example, in addition to improving transparencies made with hot melt inks as discussed above, the invention is useful to provide improved transparencies having colored images made with any other marking material which forms three-dimensional spots having curved surfaces. Accordingly, all such variations and modifications are included within the intended scope of the invention as defined by the following claims.

We claim:

1. A transparency comprising a transparent substrate, a colored ink pattern on the substrate containing three-dimensional spots of colored ink having curved surfaces and having an index of refraction, and a pattern of spots of colorless ink on the substrate having centers which are laterally displaced with respect to the centers of the colored ink spots on the substrate and having approximately the same index of refraction as that of the colored ink spots in which there is no substantial diffusion of a colored ink into colorless ink.

2. A transparency according to claim 1 wherein at least some of the colorless ink spots at least partially overlie colored ink spots.

3. A transparency according to claim 2 wherein colorless ink spots overlying colored ink spots extend over at least about one-third of the colored ink spots.

4. A transparency according to claim 1 wherein the colorless ink spots are in regions of the transparency which include or are adjacent to the colored ink spots.

5. A transparency according to claim 1 wherein the index of refraction of the colorless ink spots differs from that of the colored ink spots by no more than about 10%.

6. A transparency according to claim 1 wherein the index of refraction of the colorless ink spots differs from that of the colored ink spots by no more than about 5%.

7. A transparency according to claim 1 wherein the colored ink comprises the colorless ink with an added coloring component.

8. A transparency according to claim 7 wherein the ink in the colored and colorless ink spots is a wax-based ink.

9. A transparency according to claim 1 wherein the colorless ink has a greater spreading characteristic than the colored ink.

10. A transparency according to claim 1 wherein the colorless ink spots have a contact angle with the substrate which is less than about 25°.

11. A transparency according to claim 1 wherein the colorless ink spots have a contact angle with the substrate which is in a range from about 3° to about 20°.

12. A transparency according to claim 1 wherein the colorless ink spots have a contact angle with the substrate which is in a range from about 3° to about 10°.

13. A transparency according to claim 1 wherein the substrate is a sheet of polyester material.

14. A method for preparing a transparency comprising applying colored ink to a surface of a transparent substrate to form an ink pattern containing three-dimensional spots of colored ink having curved surfaces, and applying a pattern of three-dimensional spots of colorless ink having centers which are laterally displaced with respect to the centers of colored ink spots on the substrate and having curved surfaces to the surface of the transparency without substantial diffusion of a colored ink into the colorless ink.

15. A method according to claim 14 wherein the colorless ink spots are applied so that at least some of the colorless ink spots at least partially overlie colored ink spots.

16. A method according to claim 15 wherein the colorless ink spots overlie colored ink spots by at least about one-third of a radius of the colored ink spots.

17. A method according to claim 14 wherein the colorless ink spots are applied in regions of the transparency including or adjacent to the colored ink spots.

18. A method according to claim 14 wherein the colorless ink spots are applied to the transparency by an ink jet device.

19. A method according to claim 14 wherein the colored ink comprises the colorless ink with an added coloring component.

20. A method according to claim 14 wherein the index of refraction of the colorless ink spots differs from the index of refraction of the colored ink spots by no more than about 10%.

21. A method according to claim 14 wherein the index of refraction of the colorless ink spots differs from that of the colored ink spots by no more than about 5%.

22. A method according to claim 14 wherein a spreading characteristic of the colorless ink is greater than that of the colored ink.

23. A method according to claim 14 wherein the colorless ink has a viscosity at the temperature of application which is lower than that of the colored ink.

* * * * *